UNITED STATES PATENT OFFICE.

GEORG KRÄNZLEIN, OF LINDLINGEN, NEAR HÖCHST-ON-THE-MAIN, RUDOLF HAGENBACH, OF FRANKFORT-ON-THE-MAIN, AND FRANZ GILOY, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARYLAMINOANTHRAQUINONE DYESTUFFS AND PROCESS OF MAKING SAME.

1,138,670. Specification of Letters Patent. Patented May 11, 1915.

No Drawing. Application filed May 13, 1914. Serial No. 838,292.

*To all whom it may concern:*

Be it known that we, GEORG KRÄNZLEIN, Ph. D., RUDOLF HAGENBACH, Ph. D., and FRANZ GILOY, Ph. D., citizens of the Empire of Germany, residing at Lindlingen, near Höchst-on-the-Main, Frankfort-on-the-Main, and Höchst-on-the-Main, Germany, respectively, have invented certain new and useful Improvements in Arylaminoanthraquinone Dyestuffs and Processes of Making Same, of which the following is a specification.

We have found that valuable arylaminoanthraquinones which, in the form of their sulfonic acids constitute acid wool-dyestuffs, remarkable for their absolute fastness to potting and for their great tinctorial power, are obtained by introducing negative groups—under which we comprise a nitro group or any halogen—into anthraquinone derivatives of the general formula:

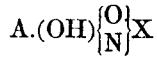

wherein A stands for a substituted or non-substituted anthraquinone residue and X for an aromatic residue containing one or more aryl groups, and wherein OH:O:N are in 1:2:3 position, condensing the products thus obtained with aromatic amins and, if required, sulfonating these condensation products.

The new wool-dyestuffs of the anthraquinone series constitute sulfonic acids of bodies of the general formula:

R.NH.A(OH)$\begin{Bmatrix}O \\ N\end{Bmatrix}$X, wherein R stands for an aryl, X for an aromatic residue and A for the anthraquinone residue. As parent materials there may be used for this reaction the oxazoles or oxazins derived from β-amino-alizarin.

The following examples illustrate our invention, the parts being by weight:

Example I: 10 parts of the nitro derivative, obtainable by treating the oxazole derived from β-aminoalizarin and benzoylchlorid with one molecular proportion of nitric acid, are heated to boiling for about one hour with 100 parts of p-toluidin and then treated in the usual manner with alcohol or diluted hydrochloric acid. The new dyestuff is thus obtained in the form of dark-violet needles. A quite similar product is obtained by using anilin instead of p-toluidin.

The condensation product obtained by using p-toluidin has the formula:—

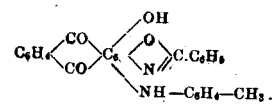

20 parts of the condensation products thus obtained are then introduced and stirred at ordinary temperature into a mixture of 100 parts of concentrated sulfuric acid and 100 parts of oleum of 25% strength; this mixture is allowed to stand for a day and is pressed upon ice. The paste thus obtained, after being filtered, is washed with a diluted solution of common salt until it becomes neutral and then dried. The resulting sulfonic acids dye wool in an acid bath fast violet tints, the dyestuff, obtained when using p-toluidin, showing a considerably more bluish tint. The violet dyeings on being subsequently chromed turn green; they are remarkable for their excellent fastness to milling, washing and potting and to light. The said wool-dyestuff obtained by using p-toluidin has the following constitution:—

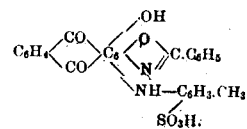

We have furthermore found that similar dyestuffs may be obtained by introducing acid residues into sulfonic acids of the aforesaid oxazole, and subjecting the products thus obtained to reaction with aromatic amins, the resulting bodies being distinguished from the above described sulfonated products by the fact that their sulfonic group is in another nucleus.

Example II: 10 parts of the oxazole obtainable from benzoylchlorid and β-amino-alizarin are sulfonated at 140–150° C. with 100 parts of oleum of 20 per cent. strength; after cooling, 5 parts of water are carefully introduced. After having added drop by drop 7.1 parts of nitrating acid of 26 per cent. strength at 0–10° C., the mixture is stirred for some hours at ordinary temperature. The whole is then poured into a cold aqueous solution of a sufficient quantity of p-toluidin sulfate, for the purpose of producing the p-toluidin salt from the sulfonic acid, the mass filtered off, washed with a small quantity of water and centrifugated or pressed. 10 parts of the dry nitrosulfonic acid thus obtained are carefully heated with 100 parts of p-toluidin and subsequently boiled for two hours. After cooling, the mass is finally treated with warm diluted hydrochloric acid and the dyestuff thus produced is filtered and washed with water. Thus the dyestuff is obtained as an indigo-blue powder, it being advantageous to convert it into its sodium salt and, if required, crystallize it from water. Instead of the nitrated sulfonic acid the halogenated acid may be employed, whereas for the p-toluidin any other aromatic amin may be substituted.

The dyestuff produced according to the foregoing example has most probably the constitution:—

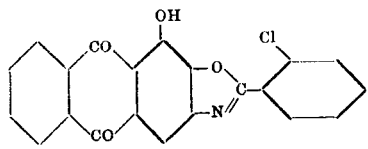

We have finally found that the reaction as above set forth may be applied generally and thus dyestuffs of similar valuable properties obtained, by synthetizing such dyestuffs as contain in 2.3 position a substituted benzoxazole nucleus or any other heterocyclic rings derived from β-aminoalizarin.

Example III: 20 parts of the nitrated oxazole which latter is obtained from o-chlorobenzoylchlorid and β-aminoalizarin, and has the formula:

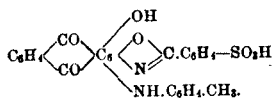

are heated to boiling with 150 parts of p-toluidin; when the reaction is complete, the fusion after being cooled to 100° C. is diluted with 150 parts of alcohol, whereupon the mass is filtered off and washed with alcohol. By sulfonating the violet color-base thus obtained, a sulfonic acid is produced which as regards the tint it dyes and its fastness is quite similar to the dyestuff referred to in the foregoing Example I. A dyestuff which as regards its tinctorial properties is almost identical with that just described, is obtained by substituting for the oxazole as above defined that derived from 2.4-dinitrobenzoylchlorid and β-aminoalizarin.

Example IV: 20 parts of the nitroderivative of the condensation product which is formed by heating equivalent quantities of β-aminoalizarin and benzoin in naphthalene whereby water is eliminated, and to which the formula:

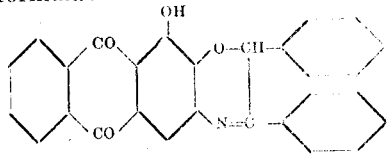

may be attributed, are treated as indicated in Example III with p-toluidin and worked up. The violet color-base thus produced, after being sulfonated, yields a dyestuff which regarding the tint it dyes and its fastness is quite analogous to that described in Example II.

Example V: 20 parts of the nitroderivative of the condensation product which is formed by heating equivalent quantities of β-aminoalizarin and bromacetophenone in naphthalene whereby water and hydrobromic acid are eliminated, and to which the formula:

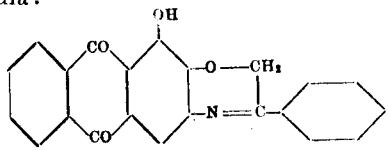

may be attributed, are treated as indicated in Example I and isolated. The violet condensation product, after being sulfonated as described in Example I, also yields a fast green chrome-dyestuff.

In all of the foregoing examples there may, of course, be used instead of the p-toluidin any other aromatic amin.

Having now described our invention, what we claim is:

1. The process of manufacturing new arylaminoanthraquinone dyestuffs, which consists in introducing acid groups into anthraquinone derivatives of the general formula:

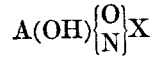

wherein A means an anthraquinone residue, and X an aromatic residue, and OH:O:N stand in 1:2:3 position, then condensing the products thus obtained with aromatic amins.

2. The process of manufacturing new arylaminoanthraquinone dyestuffs, which consists in introducing acid groups into anthraquinone derivatives of the general formula:

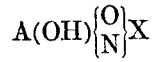

wherein A means an anthraquinone residue, and X an aromatic residue, and OH:O:N stand in 1:2:3 position, then condensing the products thus obtained with aromatic amins and sulfonating these condensation products.

3. The process of manufacturing new arylaminoanthraquinone dyestuffs, which consists in introducing negative groups into the oxazoles derived from β-aminoalizarin and an aromatic acid derivative, condensing the products obtained with aromatic amins and sulfonating these condensation products.

4. The process of manufacturing new arylaminoanthraquinone dyestuffs, which consists in introducing a nitro group into anthraquinone derivatives of the general formula:

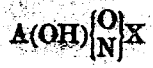

wherein A means an anthraquinone residue, and X an aromatic residue, and OH:O:N stand in 1:2:3 position, condensing the products thus obtained with aromatic amins and sulfonating these condensation products.

5. The process of manufacturing new arylaminoanthraquinone dyestuffs, which consists in nitrating the oxazole derived from β-aminoalizarin and a benzoic acid derivative, condensing the nitro product with aromatic amins and sulfonating the condensation products.

6. The process of manufacturing new arylaminoanthraquinone dyestuffs, which consists in nitrating the oxazole derived from β-aminoalizarin and a benzoic acid derivative condensing the nitro product with p-toluidin and sulfonating the condensation product.

7. As new products, the acid wool-dyestuffs of the anthraquinone series, being sulfonic acids of products of the general formula:

wherein R stands for an aryl group, X for an aromatic residue and A for an anthraquinone residue, which are soluble in water to a violet solution from which they dye wool violet tints which turn green on being subsequently treated with chrome.

8. As new products, the acid wool-dyestuffs of the anthraquinone series, being sulfonic acids of products of the general formula:

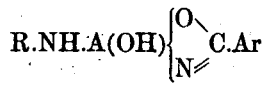

wherein R and Ar stand for an aryl-group and A for an anthraquinone residue, which are soluble in water to a violet solution from which they dye wool violet tints which turn green on being subsequently treated with chrome.

9. As new products, the acid wool-dyestuffs of the anthraquinone series, being sulfonic acids of products of the general formula:

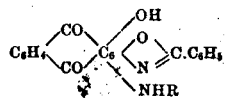

wherein R stands for an aryl group, which are solublue in water to a violet solution from which they dye wool violet tints which turn green on being subsequently treated with chrome.

10. As a new product, the acid wool-dyestuff of the anthraquinone series, being a sulfonic acid of the product of the formula:

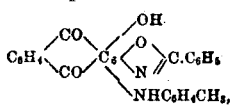

which is an indigo-blue powder, soluble in water to a violet solution from which it dyes wool violet tints which turn green on being subsequently treated with chrome.

In testimony whereof, we affix our signatures in presence of two witnesses.

GEORG KRÄNZLEIN.
RUDOLF HAGENBACH.
FRANZ GILOY.

Witnesses:
JEAN GRUND,
CARL GRUND.